Patented Jan. 8, 1924.

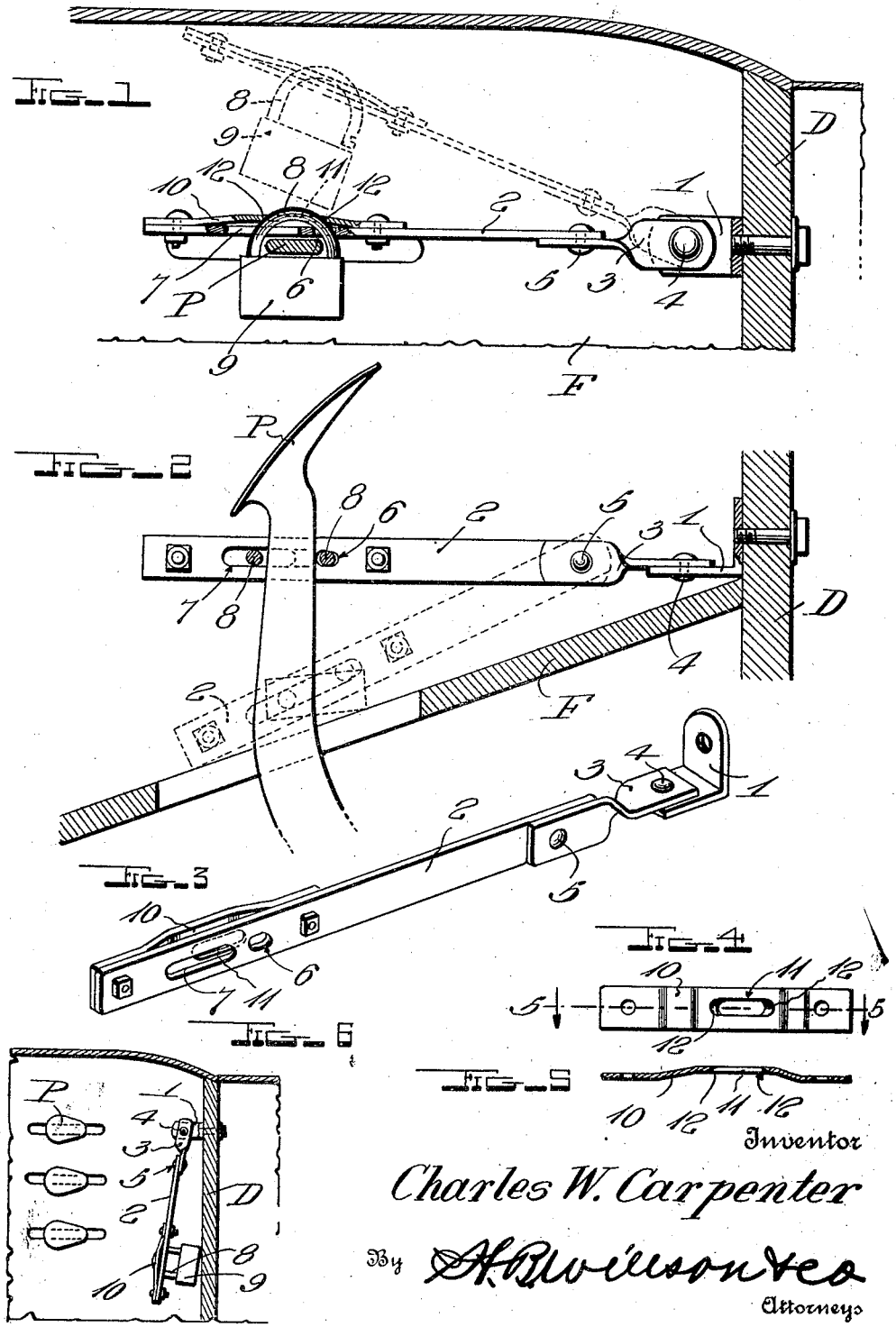

1,480,149

UNITED STATES PATENT OFFICE.

CHARLES W. CARPENTER, OF LAWRENCEVILLE, PENNSYLVANIA.

AUTOMOBILE PEDAL LOCK.

Application filed March 23, 1922. Serial No. 546,026.

*To all whom it may concern:*

Be it known that I, CHARLES W. CARPENTER, a citizen of the United States, residing at Lawrenceville, in the county of Tioga and State of Pennsylvania, have invented certain new and useful Improvements in Automobile Pedal Locks; and I do declare the following to be a full, clear, and exact description of the invention, such as will enable others skilled in the art to which it appertains to make and use the same.

This invention relates to an improved automobile pedal lock which is designed to hold the clutch pedal in neutral position to prevent operation of the automobile by unauthorized persons.

The principal object of the invention is to generally improve upon locks of this class by providing one which is practical, extremely simple in construction, adaptable for use on various makes of cars, and comparatively inexpensive to both the manufacturer and the user.

Speaking more specifically, it is another object of the invention to provide a lock of this class which embodies a pivotally mounted arm capable of being swung away from the pedal so as to prevent interference thereof with the pedal when the car is in operation, this arm being connected with the shank of the pedal by a padlock, and there being novel means associated with the arm and lock for holding the latter against accidental displacement and to hold it in the proper position to facilitate engagement with the pedal.

Other objects and advantages of the invention will be apparent during the course of the following description.

In the accompanying drawings forming a part of this specification and in which like numerals are employed to designate like parts throughout the same;

Figure 1 is a top plan view of the lever lock installed on a conventional type of automobile, showing in dotted lines, the manner of swinging it to one side of the pedal when not in use.

Figure 2 is a side elevational view.

Figure 3 is a detailed perspective view of the locking device detached.

Figure 4 is a detailed elevation of the padlock.

Figure 5 is a longitudinal section taken on the line 5—5 of Figure 4.

Figure 6 is a diagrammatic view showing the arm disposed in parallelism with the dash to position the device out of the way.

In the drawings, the letter D designates the automobile dash, P designates the clutch pedal, and F the floor board.

The improved locking device comprises a substantially L-shaped bracket 1 which is bolted or otherwise connected with the dash board, and the numeral 2 designates an arm which is connected with the horizontal arm of the bracket by means of a connecting member or plate 3. This plate 3 is twisted between its ends to dispose the arm 2 at right angles to the horizontal portion of the attached bracket. The connecting member 3 has pivotal connection at its opposite ends as at 4 and 5 with the attaching bracket and arm respectively. With this construction it will be seen that the arm 2 is capable of swinging horizontally and also vertically to enable it to be disposed in an out-of-the-way position when not in use. At its free end, the arm 2 is formed with a small opening 6 and an elongated slot 7 designed to accommodate the shackle 8 of a padlock 9. As shown in the drawings, the shackle of the padlock is designed to surround the clutch pedal to hold the same in neutral position and to prevent it from being moved forward or backward, thus preventing the clutch from being thrown into low speed.

As before intimated, it is desirable to associate with the arm, a unique means, coacting with the shackle of the padlock to prevent loss of the latter or undue movement thereof when not connected with the pedal. Although the means could be constructed otherwise, it preferably comprises a strip of metal 10 which is longitudinally bowed and rigidly connected at its opposite ends with the arm. Intermediate its ends, the plate is formed with a slot 11, the end walls which are inclined are beveled as indicated at 12 to accommodate the curved surface of that portion of the shackle which passes therethrough. It is obvious that by providing a longitudinally bowed plate and disposing the ends of the slot 11 at the proper points with respect to the aforesaid opening and slot 7 so as to accommodate the curvature of the shackle, a spring tension to be exerted against the shackle in such a manner as to hold it against displacement and undue movement and when the lock is disposed as shown in Fig. 1, spring tension is exerted against the shackle to hold the latter in this position and it will be properly disposed to facilitate quick engagement with the locking pedal. Also, it would be practically impossible for the shackle to slip through the openings 7 and 8 and permitting the padlock to become lost. It is desirable to have the padlock in position to use it all times and this is a particular feature of the invention upon which particular emphasis is to be laid.

From the foregoing description the manner of connecting the device to the pedal is obvious. It is also understood that due to the fact that the arm can move on both horizontal and vertical lines, it is capable of being disposed at a point on the machine to position out of the way. On some machines where sufficient space exists, the arm can be lifted vertically and swung toward the dash board and then swung around on its horizontal pivot to position it in substantial parallelism with the dash board. Of course it may be simply thrown over to one side as indicated by dotted lines in Fig. 1 if this is desirable. The vertical swinging of the arm is also advantageous in that it permits the arm to drop down to the inclined position shown in dotted lines in Fig. 2 so that the shackle of the lock will grip the wider portion of the clutch pedal and prevent it from being moved any appreciable distance forward or backward.

By carefully considering the description in connection with the drawings, persons familiar with devices of this class will doubtless be able to obtain a clear understanding of the invention. Therefore, a more lengthy and detailed description is deemed unneccessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. A pedal lock comprising a pivoted arm, a padlock connected with the outer end of the arm, the shackle of the padlock being designed to encircle the shank of the pedal, and a spring tension retainer connected with the outer end of the arm for engagement with the lock-shackle to prevent undue movement of the lock relative to said arm.

2. A pedal lock comprising a pivoted arm, a padlock associated with the outer end thereof, and a longitudinally bowed resilient strip connected with one side of said arm and formed with a slot for passage of a portion of the shackle of a lock, the ends of the slot being shaped to conform to the curvature of the shackle and exerting spring pressure against the shackle to prevent undue movement of the lock.

3. An automobile foot pedal lock comprising an L-shaped bracket designed to be connected with the dash-board, an arm formed at its outer end with openings to permit passage of the shackle of a padlock designed to engage the foot pedal, said arm being disposed at right angles to horizontal portion of said bracket, a connecting member in the form of plate twisted intermediate its ends, said plate being connected at its opposite ends to the bracket and arm and permitting the latter to have movement in both horizontal and vertical planes, and means cooperative with the openings at the outer end of said arm for coacting with the shackle of the lock to prevent undue movement or displacement of the lock.

In testimony whereof I have hereunto set my hand.

CHARLES W. CARPENTER.